(No Model.)
J. F. MALLINCKRODT.
TOBACCO PIPE.
No. 562,472. Patented June 23, 1896.
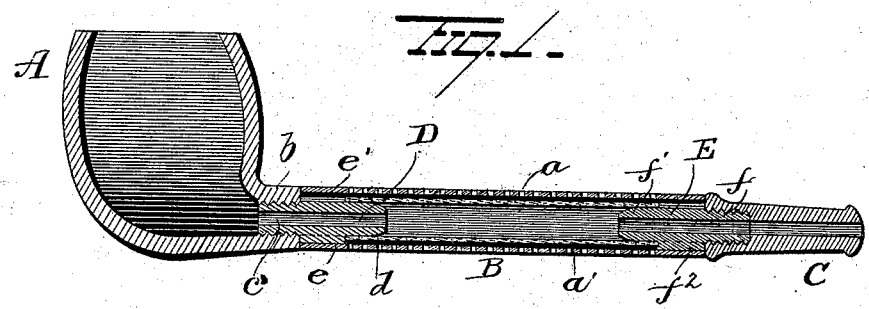
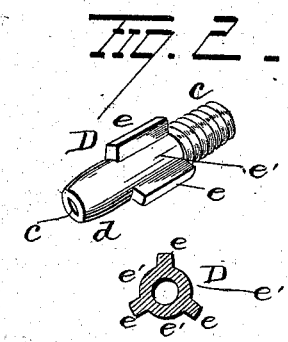
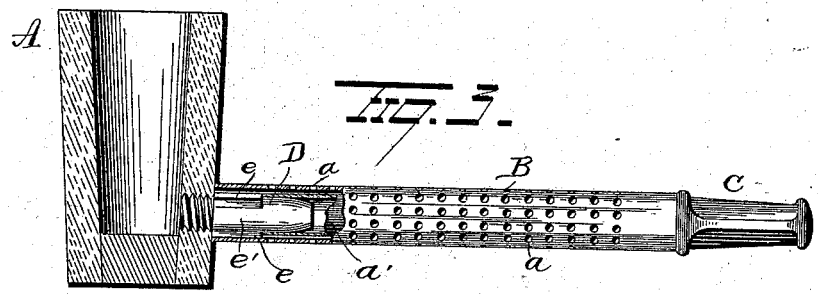
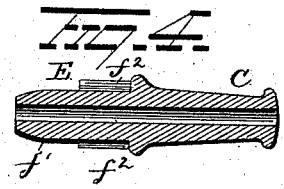
Witnesses
E. J. Nottingham
G. F. Downing
Inventor
J. F. Mallinckrodt
By H. A. Seymour
Attorney

UNITED STATES PATENT OFFICE.

JOHN F. MALLINCKRODT, OF BOULDER, COLORADO, ASSIGNOR TO THE BOULDER NOVELTY COMPANY, OF SAME PLACE.

TOBACCO-PIPE.

SPECIFICATION forming part of Letters Patent No. 562,472, dated June 23, 1896.

Application filed February 11, 1895. Serial No. 538,000. (No model.)

*To all whom it may concern:*

Be it known that I, JOHN F. MALLINCKRODT, a resident of Boulder, in the county of Boulder and State of Colorado, have invented certain new and useful Improvements in Tobacco-Pipes; and I do hereby declare the following to be a full, clear, and exact description of the invention, such as will enable others skilled in the art to which it appertains to make and use the same.

My invention relates to an improvement in tobacco-pipes, the object of the invention being to so construct a pipe that a tight joint between the bowl and the stem will, at all times, be maintained.

A further object is to produce a tobacco-pipe which shall be simple in construction and effectual, in all respects, in the performance of its functions.

With these objects in view the invention consists in certain novel features of construction and combinations and arrangements of parts, as hereinafter set forth, and pointed out in the claims.

In the accompanying drawings, Figure 1 is a sectional view illustrating my improvements. Fig. 2 is a detail view. Fig. 3 is a view showing the application of my improvements to a cob pipe. Fig. 4 is a view of a modification.

A represents the bowl of a pipe, B the stem thereof, and C the mouthpiece. The stem of the pipe preferably comprises a perforated metallic outer tube or stem $a$ and an inner tube or stem $a'$ of soft paper adapted to absorb and retain nicotine.

The bowl A of the pipe is made with an interiorly screw-threaded shank $b$ for the reception of the screw-threaded end $c$ of a shank or thimble D, the opposite end of said shank or thimble being made with a nipple $d$, adapted to enter the absorbent tube $a'$. The diameter of the shank or thimble D is appreciably less than the diameter of the metallic tube $a$ and is provided with a series of (preferably three) ribs or bearings $e$, which are so disposed as to leave spaces or recesses $e'$ between them. From this construction and arrangement of parts it will be seen that when the shank or thimble is forced into the end of the cylindrical tube $a$, said tube, between the ribs or bearings, will be straightened somewhat and the engagement of the ribs or bearings $e$ against the inner wall of the tube $a$ will be firm, and the shank or thimble being thus tightly connected with the tube. By making the shank or thimble in the manner above explained the tube will adjust itself to the variations in size of the shank or of the tube itself.

The mouthpiece C is connected to the stem B by means of a shank or thimble E, (preferably of metal,) which is constructed in the same manner as the shank or thimble D, the screw-threaded portion $f$ of the shank or thimble E being screwed into the mouthpiece and the nipple $f'$ being adapted to enter the end of the inner absorbent tube $a'$, while the interior of the end of the tube $a$ bears upon the series of ribs $f^2$. The shank E may be made integral with the mouthpiece, as shown in Fig. 4.

My improvements may be advantageously applied to a cob pipe, as shown in Fig. 3, and the objectionable feature of such pipes—viz., the passage of the nicotine and saliva through the ordinary reed stem to the mouth of the user—will be avoided by my ventilated absorbent stem.

My improvements are very simple in construction and effectual in all respects, in the performance of their functions.

Slight changes might be made in the details of construction of my invention without departing from the spirit thereof or limiting its scope, and hence I do not wish to limit myself to the precise details herein described; but, Having fully described my invention, what I claim as new, and desire to secure by Letters Patent, is—

1. A shank or thimble for a pipe adapted to enter the stem of the pipe, said shank or thimble having a series of ribs or bearings and interposed recesses, said ribs or bearings being adapted to bear against the inner face of the stem of the pipe, substantially as set forth.

2. In a pipe, the combination with a stem and a bowl, of a shank or thimble projecting from the bowl and entering the stem, said shank having a series of bearings and interposed recesses, substantially as set forth.

3. In a pipe, the combination with a stem comprising an outer and an inner tube, of a shank or thimble, one portion of which has separate bearings fitting the interior of the outer tube at points and another portion of which forms a bearing and support for the inner tube, substantially as set forth.

4. In a pipe, the combination with a stem comprising an outer and an inner tube, and a mouthpiece, of a shank or thimble interposed between the stem and mouthpiece, said shank or thimble being adapted to project into the inner tube of the stem and having ribs to bear against the inner face of the outer tube of said stem, substantially as set forth.

In testimony whereof I have signed this specification in the presence of two subscribing witnesses.

JOHN F. MALLINCKRODT.

Witnesses:
E. J. MORATH,
NOEL WARD.